United States Patent
Yamano et al.

(10) Patent No.: US 7,079,502 B2
(45) Date of Patent: Jul. 18, 2006

(54) PACKET COMMUNICATION SYSTEM, MOBILE COMMUNICATION SYSTEM, AND ADDRESSING METHOD FOR COMMUNICATION

(75) Inventors: Shigeki Yamano, Tokyo (JP); Atsushi Iwata, Tokyo (JP)

(73) Assignee: NEC Corporation (JP)

( * ) Notice: Subject to any disclaimer, the term of this patent is extended or adjusted under 35 U.S.C. 154(b) by 775 days.

(21) Appl. No.: 09/851,302

(22) Filed: May 8, 2001

(65) Prior Publication Data
US 2001/0043601 A1    Nov. 22, 2001

(30) Foreign Application Priority Data
May 16, 2000    (JP)    ............... 2000-143738

(51) Int. Cl.
*H04L 12/28*    (2006.01)
(52) U.S. Cl. .................... 370/312; 370/390
(58) Field of Classification Search ............... 370/389, 370/390, 392
See application file for complete search history.

(56) References Cited

U.S. PATENT DOCUMENTS

| | | | | |
|---|---|---|---|---|
| 5,088,091 A | * | 2/1992 | Schroeder et al. | ......... 370/406 |
| 5,442,750 A | * | 8/1995 | Harriman et al. | ........... 709/233 |
| 5,515,376 A | * | 5/1996 | Murthy et al. | ............... 370/402 |
| 5,617,421 A | * | 4/1997 | Chin et al. | ................... 370/402 |
| 6,157,622 A | * | 12/2000 | Tanaka et al. | ............... 370/312 |
| 6,611,526 B1 | * | 8/2003 | Chinnaswamy et al. | .... 370/406 |
| 6,697,359 B1 | * | 2/2004 | George | ........................ 370/357 |

FOREIGN PATENT DOCUMENTS

WO    WO-97/28502    8/1997

OTHER PUBLICATIONS

"IP Multicasting: The Complete Guide To Interactive Corporate Networks," Chapter 3, pp. 57-65, Figures 3.8, 3.11. Publication date not available at this time.

* cited by examiner

*Primary Examiner*—Chau Nguyen
*Assistant Examiner*—Cynthia L. Davis
(74) *Attorney, Agent, or Firm*—Dickstein, Shapiro, Morin & Oshinsky, LLP.

(57)    ABSTRACT

A broadcast group managing router (1) transmits a broadcast packet by attaching thereto a calculation type address which allows to arithmetically obtain a delivery destination by calculation, and each calculation type address calculating router (2 to 4) calculates the calculation type address so as to determine the delivery destination, to thereby conduct the broadcast communication.

2 Claims, 8 Drawing Sheets

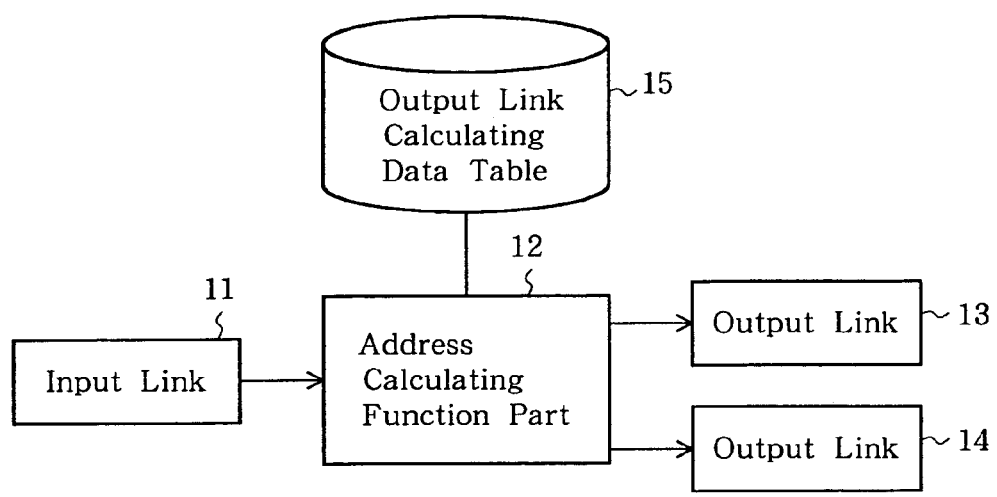
FIG.3
FIG.4
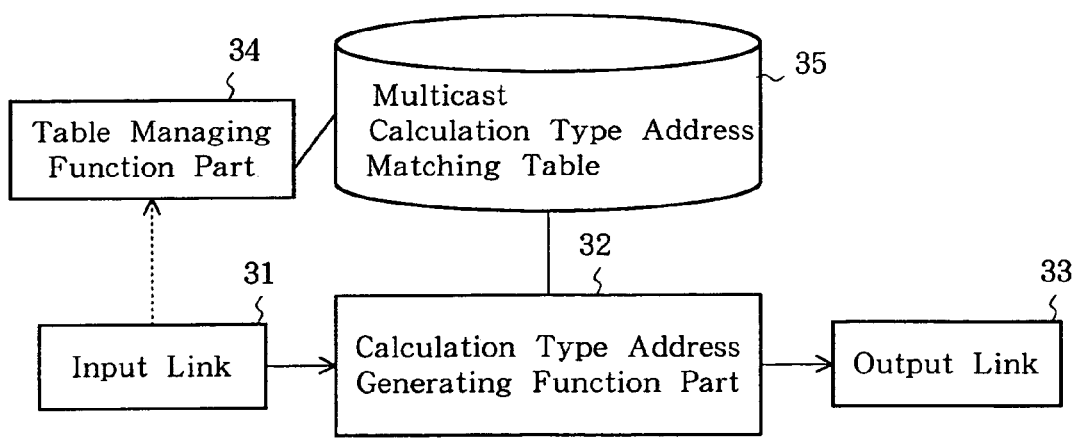
FIG.5

| Multicast Address | Calculation Type Addres |
|---|---|
| A | 1 0 1 |
| B | 1 0 0 |
| C | 0 1 1 |

| Mobile Terminal Address | Calculation Type Address |
|---|---|
| X | 0 1 1 |
| Y | 1 1 0 |
| Z | 0 0 1 |

| Multicast Address | Output Link |
|---|---|
| A | Output Link 1 |
| B | Output Link 2 |
| C | Output Link 1<br>Output Link 2 |
| D | Output Link 2 |
| ...... | ...... |

US 7,079,502 B2

PACKET COMMUNICATION SYSTEM, MOBILE COMMUNICATION SYSTEM, AND ADDRESSING METHOD FOR COMMUNICATION

BACKGROUND OF THE INVENTION

1. Field of the Invention

The present invention is utilized for packet communication having a broadcast function for a terminal group. In addition, the present invention can be utilized in a situation where the same radio data is transmitted to a single mobile terminal through a plurality of routes to thereby avoid data loss at the single mobile terminal.

2. Description of Related Art

Conventionally, the aforementioned type of packet communication system having a broadcast function for a terminal group is utilized for the purpose that a packet destined to a plurality of terminals is duplicated at a branching point on a network, such as described in Dave Kosiur, "IP Multicasting: The Complete Guide To Interactive Corporate Networks", Chapter 3, pp. 57–65, FIGS. 3.8, 3.11, to thereby enable more effective utilization of a band source on the network as compared with a situation where the packet is duplicated by the sending terminal at the same number as the destined terminals.

FIG. 14 is a schematic view of a conventional exemplary packet communication system having a broadcast function. This packet communication system having the broadcast function is constituted of multicast routers 101, 102, 103 each having a function to deliver multicast packets, and multicast receiving terminals 104, 105, 106 for receiving the multicast packets.

The multicast router 101 is connected to the multicast routers 102, 103, the multicast router 102 is connected to the multicast receiving terminals 104, 105, and the multicast router 103 is connected to the multicast receiving terminal 106.

FIG. 15 is a block diagram showing an internal constitution of each multicast router in FIG. 14. Each of the multicast routers 101 to 103 is constituted of: an input link 111 as an input interface of a packet; output links 113, 114 as output interfaces of the packet; a multicast routing function part 112 for determining, based on the address of the multicast packet, that output link(s) through which the packet is to be transferred, and for conducting the packet delivery to the determined output link; a multicast address-output link matching table 115 for holding the relationship between the multicast address(es) and the output link(s); and a multicast participating terminal managing function part 116 for processing a multicast participation registration request from that terminal requiring multicast delivery.

FIG. 16 is a block diagram showing an internal constitution of each multicast receiving terminal in FIG. 14. Each of the multicast receiving terminals 104 to 106 is constituted of: an input link 121 as an input interface of a packet; an output link 126 as an output interface of the packet; an upper layer 124 such as for conducting a procedure to pass the packet to an application, and for determining the multicast which the pertinent multicast receiving terminal participates in; a multicast registration function part 125 for conducting issuance of a participation registration request to the multicast; a participating multicast address storing part 123 for holding the multicast address which the pertinent multicast receiving terminal is participating in; and an address determining function part 122 for referring to the data of the participating multicast address storing part 123 to thereby conduct receipt determination.

FIG. 17 is an explanatory view of the multicast address-output link matching table 115 in FIG. 15. This multicast address-output link matching table 115 is constituted of a multicast address field 131 and an output link list field 132, and is used, based on the input comprising the multicast address for destinations of the multicast packet, to search for a list of output links to which the multicast packet is transferred.

There will be now described the operation of the conventional example. There will be firstly described the operation of the multicast receiving terminals 104 to 106 for participating in the multicast. In each of the multicast receiving terminals 104 to 106, the multicast registration function part 125, which has received a command from the upper layer 124 to participate in a particular multicast, writes a participation target multicast address into the participating multicast address storing part 123 and then sends: a multicast registration request described with the address of the node (multicast receiving terminal) itself and a multicast address which the node desires to participate in; to either of the adjacent multicast routers 102, 103 via output link 126.

The pertinent one of the multicast routers 102, 103 having received the multicast registration request from the input link 111 is to transfer the request to the multicast participating terminal managing function part 116.

The multicast participating terminal managing function part 116 having received the request is to add, to the multicast address-output link matching table 115, the matching relationship between: the multicast address described in the request; and the output link directed to the node which has issued the participation request. The processing is finished at this time, if the multicast address described in the request already exists in the multicast address-output link matching table 115.

When the multicast address described in the request is a new address in the multicast address-output link matching table 115, the pertinent multicast router issues a multicast registration request of the node (multicast router) itself to an adjacent multicast router which in turn conducts the same procedure as the aforementioned.

There will be now described a delivery operation of a multicast packet. In each of the multicast routers 102, 103, the multicast routing function part 112 having received the multicast packet from the input link 111 extracts the multicast address described in the multicast packet, and refers to the multicast address-output link matching table 115 to thereby obtain an output link list therefrom. The multicast routing function part 112 sends the multicast packet to those output links included in the output link list.

The address determining function part 122, of the pertinent one of the multicast receiving terminals 104 to 106 having received the multicast packet via its input link from the multicast router 102 or 103, determines whether the multicast address of the multicast packet is stored in the pertinent participating multicast address storing part 123 or not. If stored, the address determining function part 122 decides that the own node (multicast receiving terminal) is participating in the multicast, and transfers the packet to the upper layer 124. If not stored, this packet is abolished or rejected. These operations allow the multicast receiving terminals 104 to 106 to participate in the multicast and to receive packets of those multicasts which the receiving terminals have registered to participate in.

The problem of the conventional packet communication system having the broadcast function to the terminal group resides in the enormous number of pieces of management information and the enormous number of management procedures for multicast delivery.

This is due to the necessity of holding and managing output link lists for the enormous number of multicast addresses in all the multicast routers.

SUMMARY OF THE INVENTION

The present invention has been carried out in view of the above circumstances, and it is therefore an object of the present invention to provide a packet communication system capable of releasing those routers for duplicating packets from the necessity of holding and managing the information of the terminal group conducting the multicast communication, and capable of facilitating information management.

It is another object of the present invention to provide a mobile communication system: capable of releasing those routers for duplicating packets from the necessity of holding and managing the information of the transmission routes of radio data where the same radio data is transmitted to a single mobile terminal through a plurality of routes; and capable of facilitating information management.

It is a further object of the present invention to provide an addressing method: capable of releasing those routers for duplicating packets from the necessity of holding and managing the enormous number of pieces of address information; and capable of facilitating information management.

The packet communication system, according to the present invention having a broadcast function for a terminal group, is characterized in that the system converts a plurality of destination addresses of a broadcast packet into an address which can be obtained by calculation, and calculates the address: to thereby arithmetically obtain those links to which the packet is to be delivered; and to thereby determine whether the packet is destined to the pertinent node (terminal) itself. This causes the router for duplicating a packet to determine, by the calculation of the address, those links to which the packet is to be transmitted. This eliminates the necessity to hold and manage the information of the broadcast group.

The first aspect of the present invention resides in a packet communication system comprising: a plurality of terminals, and transferring means for transferring multicast packets written with the same information to the plurality of terminals.

The present invention is characterized in that the transferring means comprises: a broadcast group managing router provided with: holding means for holding calculation type addresses having bits "1" corresponding to those of the plurality of terminals to which a multicast packet is to be transferred, respectively; and assigning/sending means for assigning a pertinent calculation type address to a multicast packet and sends out the multicast packet; and at least one calculation type address calculating router provided with: holding means for holding directional route masks having bits "1" corresponding to those directional routes into which a multicast packet is to be transferred, respectively; and sending means for sending out a multicast packet to those directional routes which are given with logical products of "1" by the combination of each directional route mask and the assigned calculation type address; and that each of the plurality of terminals comprises: holding means for holding a terminal mask having a bit "1" corresponding to the terminal itself; and multicast packet receiving means for receiving a multicast packet which is given with a logical product of "1" by the combination of the terminal mask and the assigned calculation type address.

In this way, the broadcast group managing router utilizes the calculation type address to thereby indicate the information of the terminal group to which the multicast communication is conducted; each calculation type address calculating router is provided with the information of the directional route mask; and each terminal is provided with the information of the terminal mask. Further, each calculation type address calculating router included in each involved routing path conducts the routing to that directional route which is given with a logical product of "1" by the combination of the information of the calculation type address and the information of the directional route mask; and each terminal receives a multicast packet which is given with a logical product of "1" by the combination of the information of the calculation type address and the information of the terminal mask; to thereby allow to conduct multicast communication.

The amount of the information of these calculation type addresses, directional route masks and terminal masks is extremely small as compared with that in the conventional situation to cause all of the multicast routers to hold and manage output link lists for the enormous number of multicast addresses. Thus, it becomes possible to realize a packet communication system capable of releasing those routers for duplicating packets from the necessity of holding and managing the information of the terminal group conducting the multicast communication.

Further, the packet communication system of the present invention can be also utilized in a situation where the same radio data is transmitted to a single mobile terminal through a plurality of routes to thereby avoid data loss at the single mobile terminal.

Namely, the second aspect of the present invention resides in a mobile communication system comprising: a mobile terminal; a plurality of broadcast receiving routers communicated to the mobile terminal via radio link; encapsulating means for encapsulating a uni-cast packet destined to the mobile terminal into a multicast packet destined to the plurality of broadcast receiving routers; and transferring means for transferring the multicast packet; wherein the transferring means comprises: a mobile terminal position managing router provided with: holding means for holding calculation type addresses having bits "1" corresponding to those of the plurality of broadcast receiving routers to which a multicast packet is to be transferred, respectively; and assigning/sending means for assigning a pertinent calculation type address to a multicast packet and sends out the multicast packet; and at least one calculation type address calculating router provided with: holding means for holding directional route masks having bits "1" corresponding to those directional routes into which a multicast packet is to be transferred, respectively; and sending means for sending out a multicast packet to those directional routes which are given with logical products of "1" by the combination of each directional route mask and the assigned calculation type address; and wherein each of the plurality of broadcast receiving routers comprises: holding means for holding a terminal mask having a bit "1" corresponding to the terminal itself; multicast packet receiving means for receiving a multicast packet which is given with a logical product of "1" by the combination of the terminal mask and the assigned calculation type address; and de-capsulating means for de-capsulating the received multicast packet into a uni-cast packet destined to the mobile terminal.

In this way, there can be conducted the multicast communication as described above, in that: the mobile terminal position managing router represents the information concerning the broadcast receiving routers for conducting the multicast communication, by the calculation type address; each calculation type address calculating router is provided with the information of the associated directional route mask; and each broadcast receiving router is provided with the information concerning the associated terminal mask. Thus, it becomes possible to realize a mobile communication system capable of releasing those routers for duplicating packets from the necessity of holding and managing the information of the broadcast receiving routers conducting the multicast communication. Accordingly, there can be avoided data loss at a single mobile terminal, by transmitting the same radio data to the single mobile terminal through a plurality of routes.

The third aspect of the present invention resides in an addressing method for communication, comprising: at least one calculation type address having bits "1" corresponding to destinations to which a multicast packet is to be transferred; at least one directional route mask having bits "1" corresponding to those directional routes into which a multicast packet is to be transferred; and at least one terminal mask having a bit "1" corresponding to that destination which is to receive the multicast packet.

In this way, by using the calculation type address so as to represent the information of the destination group to which the multicast communication is conducted, by using the directional route mask so as to represent the directional route information of the destination to which the multicast communication is conducted, and by using the terminal mask so as to represent the information for identifying whether the pertinent terminal is the destination of the multicast communication; those routers on the way of the route of the multicast are to route the multicast packet to that directional route given with the logical product of "1" by the combination of the information of the calculation type address and the information of the directional route mask, while the destination receives a multicast packet given with the logical product of "1" by the combination of the information of the calculation type address and the information of the terminal mask; to thereby allow to drastically reduce the amount of information to be held and managed.

BRIEF DESCRIPTION OF THE DRAWINGS

Specific embodiments of the present invention will now be described, by way of example only, with reference to the accompanying of drawings in which:

FIG. 3 is a block constitutional diagram of a calculation type address calculating router according to the first embodiment of the present invention;

FIG. 4 is an explanatory view of an output link calculating table;

FIG. 5 is a block constitutional diagram of a broadcast group managing router according to the first embodiment of the present invention;

DETAILED DESCRIPTION OF THE PREFERRED EMBODIMENTS

First Embodiment

Figure 1:
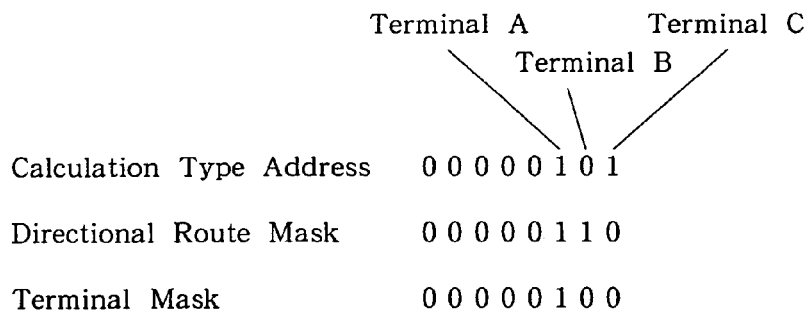
FIG. 1 is an explanatory view of a calculation type address in the present invention.
Figure 2:
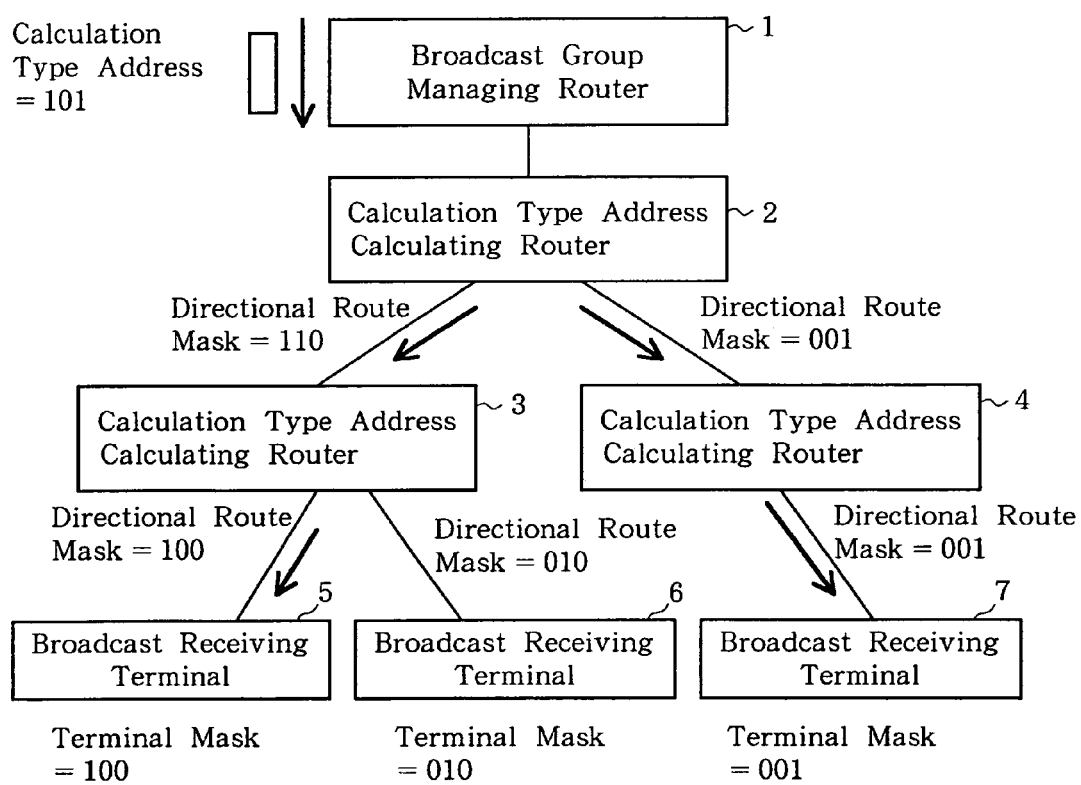
FIG. 2 is an overall constitutional diagram of a packet communication system according to a first embodiment of the present invention.
Figures 6, 7:
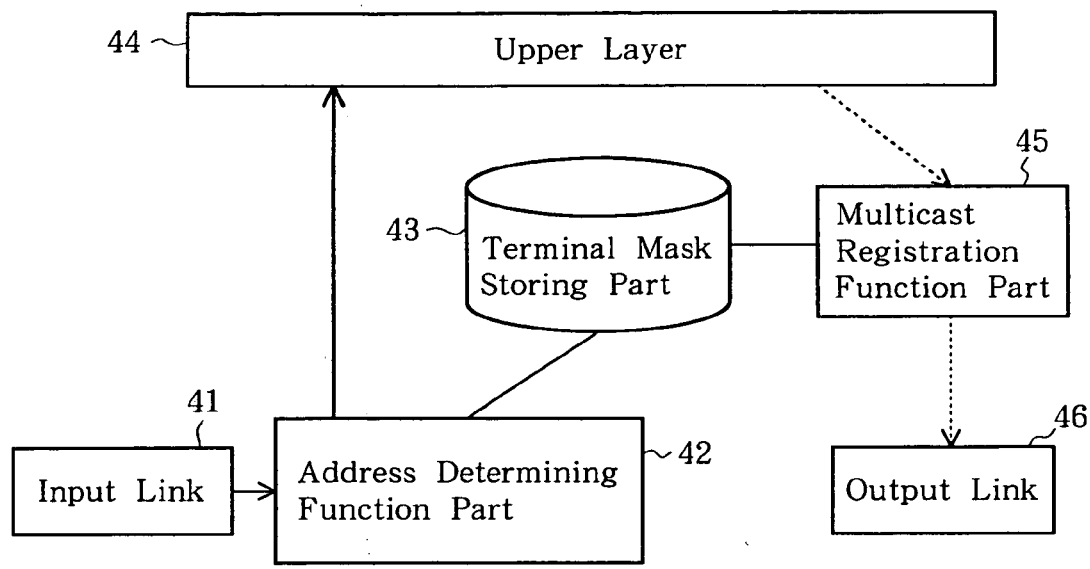
FIG. 6 is a block constitutional diagram of a broadcast receiving terminal according to the first embodiment of the present invention.
FIG. 7 is an explanatory view of a multicast calculation type address matching table.

There will be described a packet communication system according to a first embodiment of the present invention, with reference to FIGS. 1, 2, 3, 5 and 6. FIG. 1 is a view showing an addressing method of the present invention. FIG. 2 is an overall constitutional diagram of a packet communication system according to a first embodiment of the present invention. FIG. 3 is a block constitutional diagram of a calculation type address calculating router according to the first embodiment of the present invention. FIG. 5 is a block constitutional diagram of a broadcast group managing router according to the first embodiment of the present invention. FIG. 6 is a block constitutional diagram of a broadcast receiving terminal according to the first embodiment of the present invention.

The first embodiment of the present invention is a packet communication system comprising a plurality of broadcast receiving terminals 5, 6, 7, and means for transferring multicast packets written with the same information to the broadcast receiving terminals 5, 6, 7, respectively.

The present invention is characterized in that: the transferring means comprises a broadcast group managing router 1 and calculation type address calculating routers 2 to 4, while each of the broadcast receiving terminals 5 to 7 comprises a terminal mask storing part 43 and an address determining function part 42. The broadcast group managing router 1 comprises: a multicast calculation type address matching table 35 for holding calculation type addresses having bits "1" corresponding to broadcast receiving terminals 5 to 7 to which a multicast packet is to be transferred, respectively; and a pertinent calculation type address generating function part 32 for assigning a calculation type address to a multicast packet and for sending it out. Each of the calculation type address calculating routers 2 to 4 comprises: an output link calculating data table 15 for holding directional route masks having bits "1" corresponding to those directional routes into which a multicast packet is to be transferred, respectively; and an address calculating function part 12 for sending out a multicast packet to those directional routes which are given with logical products (AND) of "1" by the combination of each directional route mask and the calculation type address. In each of the broadcast receiving terminals 5 to 7, the terminal mask storing part 43 holds a terminal mask having a bit "1" corresponding to the pertinent broadcast receiving terminal itself, and the address determining function part 42 receives a multicast packet which is given with a logical product (AND) of "1" by the combination of the terminal mask and the calculation type address.

In this way, the present invention is characterized by an addressing method comprising: at least one calculation type address having bits "1" corresponding to destinations to which a multicast packet is to be transferred; at least one directional route mask having bits "1" corresponding to those directional routes into which a multicast packet is to be transferred; and at least one terminal mask having a bit "1" corresponding to that destination which is to receive the multicast packet.

There will be described hereinafter the first embodiment of the present invention in more detail. As shown in FIG. 1, each bit of the calculation type address indicates whether the delivery to the broadcast receiving terminals 5 to 7 is required or not. The calculation type address shown in FIG. 1 has the 3rd, 2nd and 1st bits as counted from the lowermost, which bits indicate the presence/absence of delivery to terminals A, B and C, respectively. The address in the shown example indicates the necessity of delivery to the terminal A and terminal C, since the 3rd bit and 1st bit are "1".

Further, the links of each of calculation type address calculating routers 2 to 4 are provided with the directional route masks, respectively, so as to arithmetically determine, from the calculation type address, whether the delivery to each link is required or not. Each directional route mask has bits "1" corresponding to that (those) of broadcast receiving terminals 5 to 7, which is (are) placed at the heading direction or downstream of the link of the pertinent calculation type address calculating router. As such, it is determined that the delivery to the link to the pertinent broadcast receiving terminal(s) is necessary, when the logical product of the calculation type address and the directional route mask is "1" or greater.

Further, each of the broadcast receiving terminals 5 to 7 is provided with the terminal mask for determining whether the pertinent broadcast receiving terminal itself is destined by the calculation type address or not. Each terminal mask has a bit "1" indicative of the presence/absence of delivery to the pertinent terminal itself, and the remaining bits "0". Thus, the calculation type address is determined to be destined to the pertinent node (terminal) itself, when the logical product of the calculation type address and the terminal mask becomes "1".

As shown in FIG. 2, the packet communication system is constituted of: the broadcast group managing router 1 for managing the broadcast group and for generating the calculation type address; the calculation type address calculating routers 2, 3, 4 for conducting delivery to destined links by the address calculation; and broadcast receiving terminals 5, 6, 7.

The broadcast group managing router 1 is connected to the calculation type address calculating router 2, the calculation type address calculating router 2 is connected to the calculation type address calculating routers 3, 4, the calculation type address calculating router 3 is connected to the broadcast receiving terminals 5, 6, and the calculation type address calculating router 4 is connected to the broadcast receiving terminal 7. Further, the terminal masks of the broadcast receiving terminals 5, 6, 7 are set at "100", "010" and "001", respectively.

Those directional route masks of the calculation type address calculating router 2, which are provided for output links connected to the calculation type address calculating routers 3, 4, are set at "110" and "001", respectively. Those directional route masks of the calculation type address calculating router 3, which are provided for output links connected to the broadcast receiving terminals 5, 6, are set at "100" and "010", respectively. That directional route mask of the calculation type address calculating router 4, which is provided for the output link connected to the broadcast receiving terminal 7, is set at "001".

As shown in FIG. 3, the input link 11 having a packet receiving function is connected to the address calculating function part 12 for calculating the calculation type address, and this address calculating function part 12 is connected: to the output link calculating data table 15 stored with the data to be required when the output link(s) is(are) calculated from the calculation type address; and to output links 13, 14 each having a packet transmitting function.

FIG. 4 is an explanatory view of the output link calculating data table 15. This output link calculating data table 15 is constituted of an output link list field 21 and a directional route mask field 22, and is used to search for directional route masks based on associated output links, respectively.

As shown in FIG. 5, the calculation type address generating function part 32 for generating the calculation type address is connected to: an input link 31 having a packet receiving function; the multicast calculation type address matching table 35; and an output link 33 having a packet transmitting function. Further, connected to the input link 31 and to the multicast calculation type address matching table 35 is a table managing function part 34 which prepares calculation type addresses for registering terminal-participation in the multicast, at the multicast calculation type address matching table 35.

As shown in FIG. 6, each address determining function part 42, which determines whether a packet is to be received by a pertinent one of the broadcast receiving terminals 5 to 7 based on the address of the packet, is connected to: an input link 41 having a packet receiving function; the terminal mask storing part 43 for holding the terminal mask required in calculating whether the calculation type address is destined to the pertinent broadcast receiving terminal itself; and an upper layer 44 having a function to send the packet such as to an application.

Further, connected to the upper layer 44, the terminal mask storing part 43 and an output link 46 having a packet transmitting function, is a multicast registration function part 45 for conducting a participation registering procedure to the multicast.

FIG. 7 is a view for explaining the multicast calculation type address matching table 35. This multicast calculation type address matching table 35 is constituted of a multicast address field 51 and a calculation type address field 52, and is used to search for a calculation type address based on the multicast address.

There will be now explained operations of the packet communication system according to the first embodiment of the present invention. The operations of the packet communication system having the broadcast function include (1) a terminal registering operation to a broadcast group, and (2) a broadcast packet transferring operation. Firstly, concerning (1) the terminal registering operation to the broadcast group, there will be explained a situation where the broadcast receiving terminal 5 is to register its participation at the receiving group of the multicast address A.

The multicast registration function part 45 of the broadcast receiving terminal 5, which is requested from its upper layer 44 to participate in the multicast address A, prepares a multicast participating request describing: that value "100" (noted in binary) corresponding to the terminal mask of the node itself, which is obtained from the terminal mask storing part 43; and the participating target multicast address A. The multicast registration function part 45 further sends this multicast participating request, via its output link 46, to the broadcast group managing router 1. At the broadcast group managing router 1, this multicast participating request is transferred to the table managing function part 34 via input link 31.

This table managing function part 34: searches for that calculation type address the multicast address field of which is "A", in the multicast calculation type address matching table 35; takes a logical sum of the calculation type address obtained by the above search and the value "100" (noted in binary) of the terminal mask described in the multicast participating request; and writes this value, as a new calculation type address, into the entry multicast address field of which is "A". The aforementioned operations complete the registration of the broadcast receiving terminal 5 to the multicast group.

Next, concerning (2) the broadcast packet transferring operation, there will be explained a situation where the multicast address is "A". Each packet of the multicast address A arrived at the input link 31 of the broadcast group managing router 1 is transferred to the calculation type address generating function part 32.

This calculation type address generating function part 32: looks up the multicast calculation type address matching table 35 based on the address A of the packet; obtains the calculation type address "101" (noted in binary); then substitutes the thus obtained calculation type address, for the destination of the packet; and transmits the packet to the calculation type address calculating router 2.

This calculation type address calculating router 2 receives the packet at its input link 11, and conducts, at the address calculating function part 12, an address calculation for determining whether the packet is to be transmitted to the output links 13 and/or 14 or not.

Figure 8:
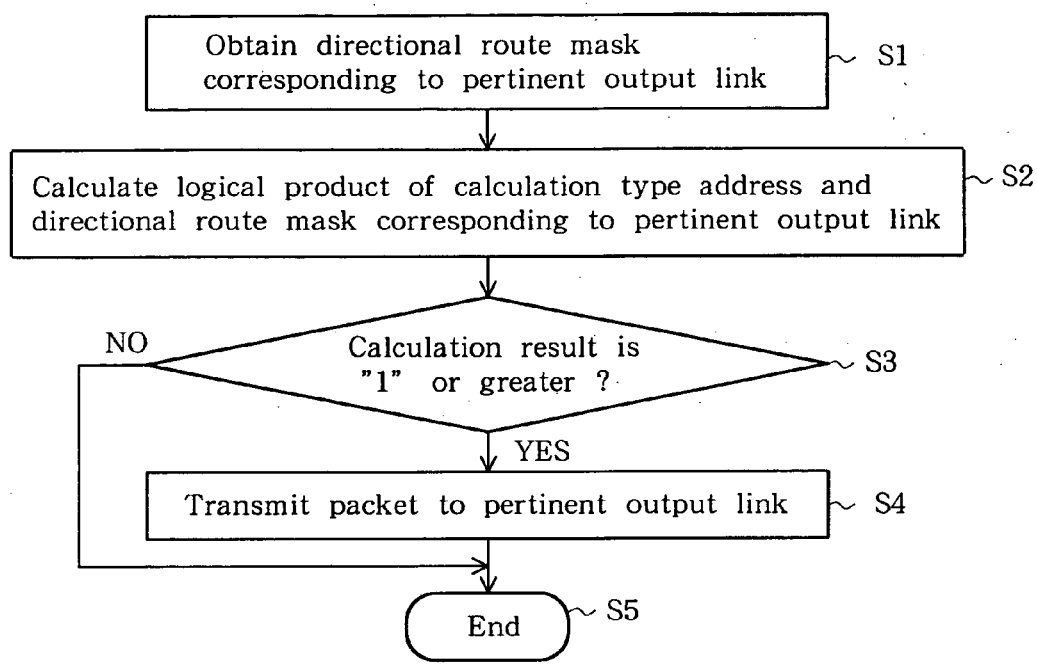
FIG. 8 is a flowchart showing an operation of an address calculating function part.

FIG. 8 is an operation flowchart of an address calculation for each output link of the address calculating function part 12 shown in FIG. 3. The address calculating function part 12 having received the multicast packet firstly conducts an address calculation for the output link 13. At step S1, the directional route mask "110" (noted in binary) corresponding to the output link 13 is obtained by looking up the output link calculating data table 15.

Next, at step S2, there is calculated a logical product of the obtained directional route mask "110" and the calculation type address "101" of the packet. At step S3, it is determined whether the calculation result of the above logical product is "1" or greater. If less than "1", the flow transfers to step S5 so as to terminate the address calculation procedure for the output link 13. If "1" or greater, the flow transfers to step S4 so as to send the packet to the output link 13. In this example, the calculation result is "1" or greater, so that the packet is transferred to the output link 13.

Next, there is conducted the same procedure for the output link 14 as the above. Also in this case, the logical product of the directional route mask "001" and the calculation type address "101" is "1" or greater, so that the packet is transferred to the output link 14. This terminates the address calculations of all of the output links 13, 14, so that the address calculating function part 12 terminates the procedure.

Those packets transmitted to the output links 13, 14 of the calculation type address calculating router 2 are transferred to the calculation type address calculating routers 3, 4, respectively, which conduct the same procedures as the calculation type address calculating router 2.

The calculation results of the directional route masks and the same calculation type addresses toward the broadcast receiving terminals 5, 6, 7 are "1" or greater, less than "1", and "1" or greater, respectively, so that the packets are transferred to the broadcast receiving terminals 5 and 7, respectively.

The packet received at the broadcast receiving terminal 5 is transferred from its input link 41 to its address determining function part 42. The address determining function part 42 conducts a determining procedure as to whether the packet is destined to the node (i.e., the terminal) itself.

Figure 9:
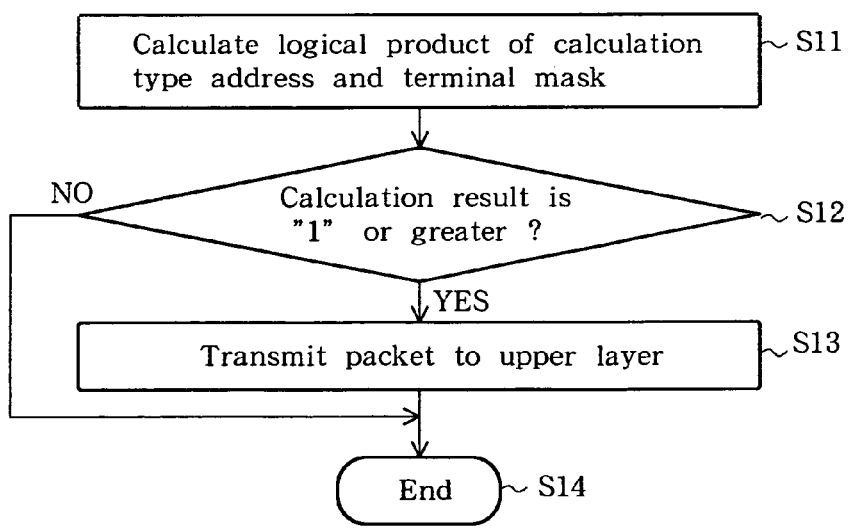
FIG. 9 is a flowchart showing an operation of an address determining function part.

FIG. 9 is an operation flowchart of a determining procedure as to whether a packet is destined to the node itself, to be conducted by the address determining function part 42 of FIG. 6. At step S11 as shown in FIG. 9, the address determining function part 42 calculates a logical product of the calculation type address "101" (noted in binary) of the packet and the terminal mask "100" (noted in binary) of the node itself obtained from the terminal mask storing part 43.

At step S12, it is determined whether the calculation result is "1" or greater. If less than "1", the flow transfers to step S14 so as to terminate the procedure of node-itself destined determination. If "1" or greater, it is determined that the packet is destined to the node itself, so that the flow transfers to step S13 so as to transfer the packet to the associated upper layer 44. The procedure is then terminated at step S14. In the case of this example, the calculation result is "1" or greater, so that the packet is transferred to the upper layer 44. There is also conducted the same procedure for the packet received at the broadcast receiving terminal 7. Since the calculation result is "1" or greater, the packet is passed to its associated upper layer 44. This terminates the transference of a broadcast packet.

Second Embodiment

Figure 10:
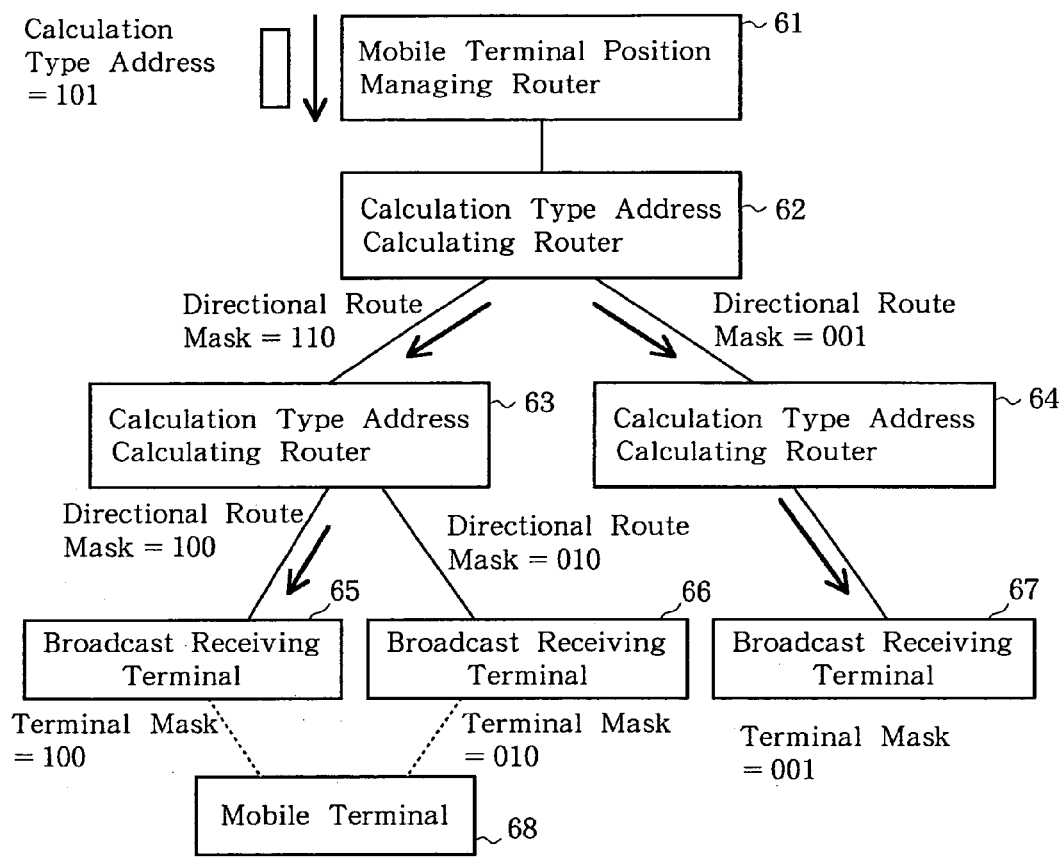
FIG. 10 is an overall constitutional diagram of a mobile communication system according to a second embodiment of the present invention.
Figure 11:
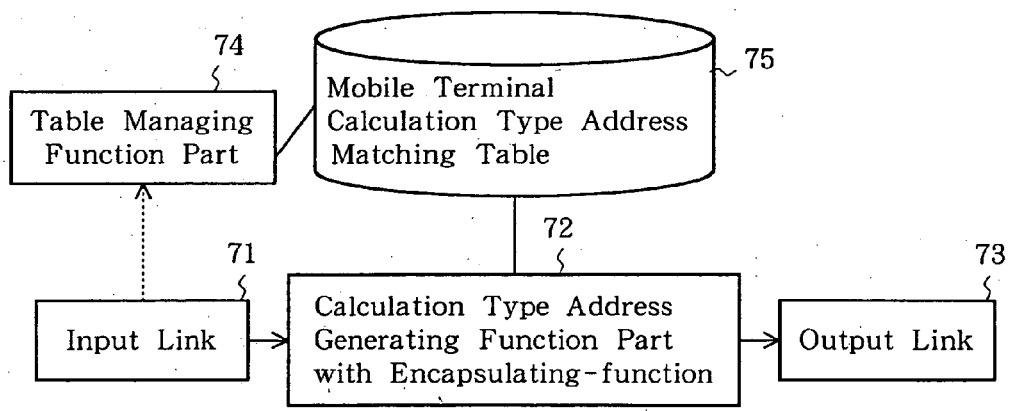
FIG. 11 is a block constitutional diagram of a broadcast group managing router according to the second embodiment of the present invention.
Figures 12, 13:
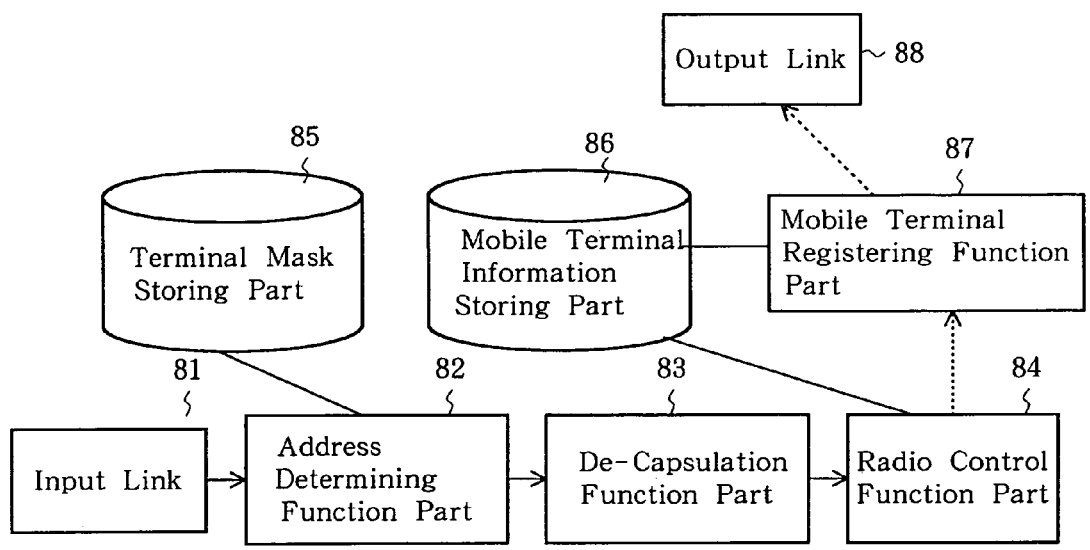
FIG. 12 is a block constitutional diagram of a broadcast receiving router according to the second embodiment of the present invention.
FIG. 13 is an explanatory view of a mobile terminal calculation type address matching table.
Figure 14:
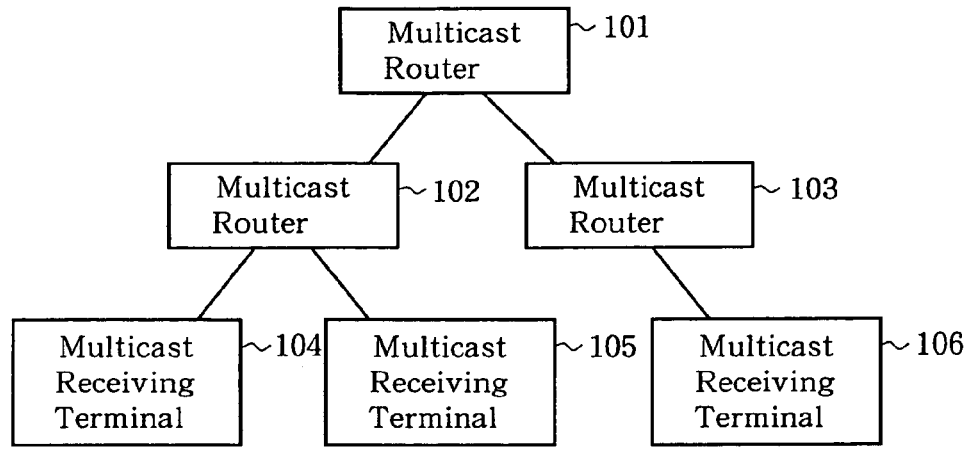
FIG. 14 is an overall constitutional diagram of a packet communication system having a conventional broadcast function.
Figure 15:
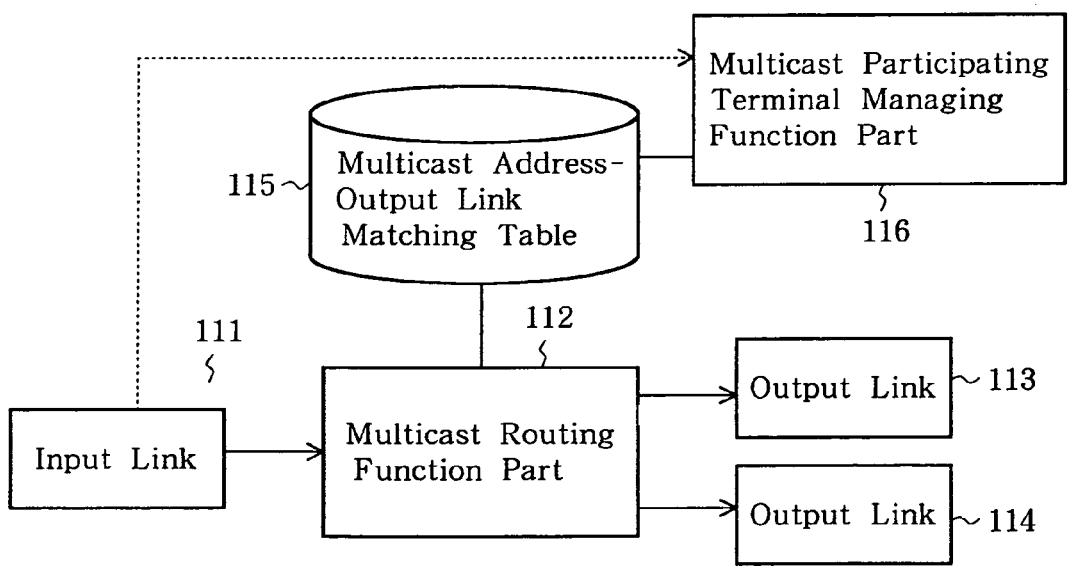
FIG. 15 is a block constitutional diagram of a conventional multicast router.
Figures 16, 17:
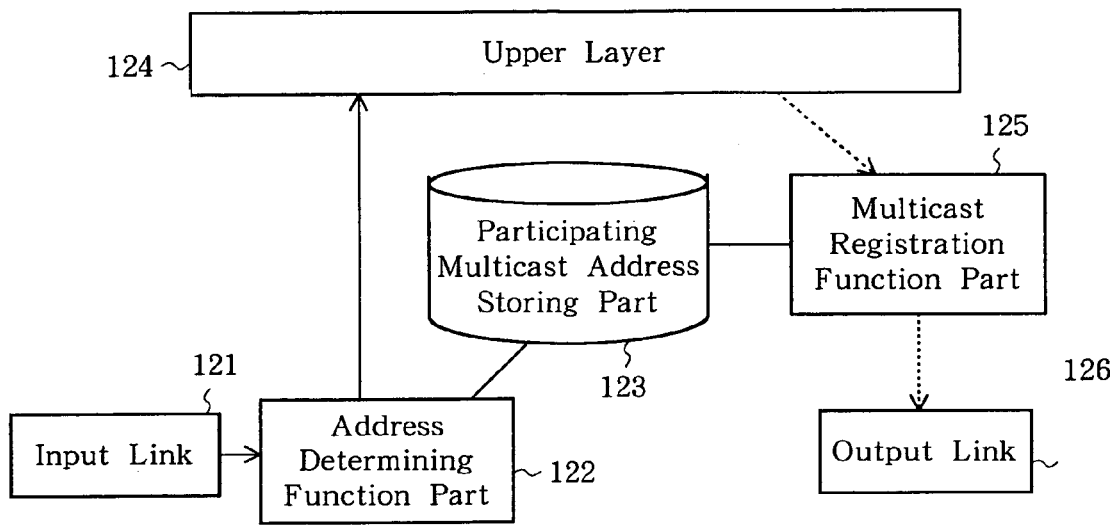
FIG. 16 is a block constitutional diagram of a conventional multicast receiving terminal.
FIG. 17 is an explanatory view of a conventional multicast address-output link matching table.

There will be now described a mobile communication system according to a second embodiment of the present invention, with reference to FIGS. 10 through 13. FIG. 10 is an overall constitutional diagram of the mobile communication system according to the second embodiment of the present invention. FIG. 11 is a block constitutional diagram of a mobile terminal position managing router. FIG. 12 is a block constitutional diagram of a broadcast receiving router. FIG. 13 is an explanatory view of a mobile terminal calculation type address matching table.

The second embodiment of the present invention is the mobile communication system aiming at utilizing the packet communication system described in the first embodiment of the present invention, so as to transmit the same radio data to a single mobile terminal through a plurality of transmission routes, to thereby avoid data loss at the single mobile terminal.

Namely, the second embodiment of the present invention is characterized by the following constitution. The constitution comprises: a mobile terminal 68; a plurality of broadcast receiving routers 65 to 67 communicated with the mobile terminal 68 via radio link; a mobile terminal position managing router 61 for encapsulating a uni-cast packet destined to the mobile terminal 68 into a multicast packet destined to the plurality of broadcast receiving routers; and calculation type address calculating routers 62 to 64 for transferring the multicast packet. The mobile terminal position managing router 61 comprises: a mobile terminal calculation type address matching table 75 for holding calculation type addresses having bits "1" corresponding to broadcast receiving routers 65 to 67 to which a multicast packet is to be transferred, respectively; and a calculation type address generating function part 72 having an encapsulating-function, for assigning a pertinent calculation type address to a multicast packet and for sending it out. Each of the calculation type address calculating routers 62 to 64 comprises: an output link calculating data table 15 for holding directional route masks having bits "1" corresponding to those directional routes into which a multicast packet is to be transferred, respectively; and an address calculating function part 12 for sending out a multicast packet to those directional routes which are given with logical products of "1" by the combination of each directional route mask and the calculation type address. Each of the broadcast receiving routers 65 to 67 comprises: a terminal mask storing part 85 for holding a terminal mask having a bit "1" corresponding to the pertinent broadcast receiving router itself; an address determining function part 82 for receiving a multicast packet which is given with a logical product of "1" by the combination of the terminal mask and the calculation type address; and a de-capsulation function part 83 for de-capsulating the received multicast packet into a uni-cast packet destined to the mobile terminal 68.

There will be described hereinafter the second embodiment of the present invention in more detail. As shown in FIG. 10, the mobile communication system according to the second embodiment of the present invention is constituted of: the mobile terminal position managing router 61 for managing the positions of the mobile terminal and for generating the calculation type addresses; calculation type address calculating routers 62, 63, 64 for conducting delivery to the destinations by the address calculations, respectively; broadcast receiving routers 65, 66, 67; and the mobile terminal 68.

The mobile terminal position managing router 61 is connected to the calculation type address calculating router 62. The calculation type address calculating router 62 is connected to calculation type address calculating routers 63, 64. The calculation type address calculating router 63 is connected to the broadcast receiving routers 65, 66. The calculation type address calculating router 64 is connected to the broadcast receiving router 67. The mobile terminal 68 is communicated with the broadcast receiving routers 65, 66 via radio link. Further, the terminal masks of the broadcast receiving routers 65, 66, 67 are set at "100", "010" and "001", respectively.

Those directional route masks of the calculation type address calculating router 62, which are provided for output links connected to the calculation type address calculating routers 63, 64, are set at "110" and "001", respectively. Those directional route masks of the calculation type address calculating router 63, which are provided for output links connected to the broadcast receiving terminals 65, 66, are set at "100" and "010", respectively. That directional route mask of the calculation type address calculating router 64, which is provided for the output link connected to the broadcast receiving terminal 67, is set at "001".

As shown in FIG. 11, the calculation type address generating function part 72 having an encapsulating-function, for generating the calculation type addresses and for encapsulating packets, is connected to: an input link 71 having a packet receiving function; the mobile terminal calculation type address matching table 75; and an output link 73 having a packet transmitting function.

Further, connected to the input link 71 and the mobile terminal calculation type address matching table 75 is a table managing function part 74 for managing the broadcast receiving routers 65 to 67 to which mobile-terminal-destined packets are to be transmitted, and for preparing calculation type addresses to be registered into the mobile terminal calculation type address matching table 75.

As shown in FIG. 12, each address determining function part 82, which determines whether a packet is to be received by a pertinent one of the broadcast receiving routers 65 to 67 based on the address of the packet, is connected to: an input link 81 having a packet receiving function; the terminal mask storing part 85 for holding the terminal mask required in calculating whether the calculation type address is destined to the terminal; and a radio control function part 84 having a function to transmit packets such as to an application.

Further, connected to the radio control function part 84, the terminal mask storing part 85 and an output link 88 having a packet transmitting function, is a mobile terminal registering function part 87 for conducting a participation registering procedure to the multicast.

The mobile terminal calculation type address matching table 75 shown in FIG. 13 is constituted of a mobile terminal address field 91 and a calculation type address field 92, and is used to search for a calculation type address based on the mobile terminal address.

There will be now explained operations of the mobile communication system according to the second embodiment of the present invention. The mobile communication system according to the second embodiment of the present invention aims at avoiding data loss by transmitting radio data to the mobile terminal 68 through the plurality of broadcast receiving routers 65 to 67. These operations include (1) a registering operation of a mobile terminal position, and (2) a transferring operation of mobile-terminal-destined packets. Firstly, (1) the registering operation of a mobile terminal position will be explained.

This operation is to register the broadcast receiving routers 65 to 67 at the broadcast group of packets destined to the mobile terminal 68. The mobile terminal 68 shown in FIG. 10 is capable of establishing or opening radio links with a plurality of broadcast receiving routers, which are the broadcast receiving routers 65, 66 in the situation of FIG. 10. Concerning pertinent ones of the broadcast receiving routers 65 to 67, establishing such radio links with the mobile terminal 68 causes the radio control function part 84 of FIG. 12 to send a link-established notice together with the address of the mobile terminal 68, to the mobile terminal registering function part 87.

The mobile terminal registering function part 87 having received the notice writes the address included therein into a mobile terminal information storing part 86, and then transmits, via output link 88 to the mobile terminal position managing router 61, a mobile terminal position registration request described with the address of the mobile terminal 68 and with the terminal mask of the pertinent node (broadcast receiving router) itself.

The mobile terminal position managing router 61 having received the registration request transfers this request to the table managing function part 74. This table managing function part 74 looks up the contents of the calculation type addresses of the mobile terminal calculation type address matching table 75, based on the mobile terminal address described in the request. The table managing function part 74 then takes a logical sum of the calculation type address obtained by the above look-up and the value of the terminal mask described in the request, and writes back the logical sum, as a new calculation type address, into the original entry. The aforementioned operations complete the broadcast registration of the pertinent ones of broadcast receiving routers 65 to 67 destined to the mobile terminal 68.

There will be now described (2) the transferring operation of mobile-terminal-destined packets. Upon receiving a packet destined to the mobile terminal 68 via input link 71, the mobile terminal position managing router 61 transfers the packet to the calculation type address generating function part 72 having the encapsulating-function.

The calculation type address generating function part 72 having the encapsulating-function: conducts an encapsulating procedure to add a new header to the packet; sets the destination address of the header, at that calculation type address which has been retrieved from the mobile terminal calculation type address matching table 75 based on the destination address of the packet destined to the mobile terminal 68; and transfers the packet to the output link 73. There are conducted thereafter the same operations as the first embodiment of the present invention, for transferring the packet to respective broadcast receiving routers by the calculation of the calculation type address of the packet and the pertinent directional route mask.

Upon arrival of the packet at those of the broadcast receiving routers 65 to 67 which have conducted the mobile terminal registration requests, the packet is transferred from the pertinent input link 81 to the associated address determining function part 82, and the address determining function part 82 conducts a determining procedure as to whether the packet is destined to the pertinent node (broadcast receiving router) itself. This procedure is the same as the first embodiment of the present invention, except for the situation where the packet is determined to be destined to the pertinent node itself. If the packet is determined to be destined to the pertinent node itself, the packet is transferred to the de-capsulation function part 83.

The de-capsulation function part 83 removes the header added to the packet by the mobile terminal position managing router 61, and then transmits the packet to the radio control function part 84. The radio control function part 84 retrieves a radio link from the information of the mobile terminal address, and transfers the packet to the mobile terminal 68. The aforementioned operations complete the transferring operation of the mobile-terminal-destined packet.

According to the present invention as described above, there can be realized a packet communication system capable of releasing those routers for duplicating packets from the necessity of holding and managing the information of the terminal group conducting the multicast communication, and capable of facilitating information management. There can be further realized a mobile communication system: capable of releasing those routers for duplicating packets from the necessity of holding and managing the information of the transmission routes of radio data where the same radio data is transmitted to a single mobile terminal through a plurality of routes; and capable of facilitating information management. There can be provided an addressing method: capable of releasing those routers for duplicating packets from the necessity of holding and managing the enormous number of pieces of address information; and capable of facilitating information management.

What is claimed is:

1. A packet communication system comprising:
a plurality of terminals, and
transferring means for transferring multicast packets written with the same information to said plurality of terminals;
wherein said transferring means comprises:
a broadcast group managing router provided with: holding means for holding calculation type addresses having bits "1" corresponding to those of said plurality of terminals to which a multicast packet is to be transferred, respectively; and assigning/sending means for assigning a pertinent calculation type address to a multicast packet and sending out the multicast packet; and
at least one calculation type address calculating router provided with: holding means for holding directional route masks having bits "1" corresponding to those directional routes into which a multicast packet is to be transferred, respectively; and sending means for sending out a multicast packet to those directional routes which are given with logical products of "1" by the combination of each directional route mask and said assigned calculation type address; and
wherein each of said plurality of terminals comprises:
holding means for holding a terminal mask having a bit "1" corresponding to the terminal itself; and
multicast packet receiving means for receiving a multicast packet which is given with a logical product of "1" by the combination of said terminal mask and said assigned calculation type address.

2. A mobile communication system comprising:
a mobile terminal;
a plurality of broadcast receiving routers communicated to said mobile terminal via radio link;
encapsulating means for encapsulating a uni-cast packet destined to said mobile terminal into a multicast packet destined to said plurality of broadcast receiving routers; and
transferring means for transferring the multicast packet;
wherein said transferring means comprises:
a mobile terminal position managing router provided with: holding means for holding calculation type addresses having bits "1" corresponding to those of said plurality of broadcast receiving routers to which a multicast packet is to be transferred, respectively; and assigning/sending means for assigning a pertinent calculation type address to a multicast packet and sending out the multicast packet; and
at least one calculation type address calculating router provided with: holding means for holding directional route masks having bits "1" corresponding to those directional routes into which a multicast packet is to be transferred, respectively; and sending means for sending out a multicast packet to those directional routes which are given with logical products of "1" by the combination of each directional route mask and said assigned calculation type address; and
wherein each of said plurality of broadcast receiving routers comprises:
holding means for holding a terminal mask having a bit "1" corresponding to the terminal itself;
multicast packet receiving means for receiving a multicast packet which is given with a logical product "1" by the combination of said terminal mask and said assigned calculation type address; and
de-capsulating means for de-capsulating the received multicast packet into a uni-cast packet destined to said mobile terminal.

* * * * *